(12) United States Patent
Viehmann et al.

(10) Patent No.: US 7,788,138 B2
(45) Date of Patent: Aug. 31, 2010

(54) METHOD OF DEVELOPING SPECIFIC CONTENT AND CREATING STANDARDIZED CONTENT FROM THE SPECIFIC CONTENT

(75) Inventors: Robert Viehmann, Waghausel (DE);
Miho Emil Birimisa, Karlsruhe (DE);
Tianyang Wang, Shanghai (CN);
Jianyuan Yang, Shanghai (CN); Yinling Ni, Shanghai (CN)

(73) Assignee: SAP AG, Walldorf (DE)

( * ) Notice: Subject to any disclaimer, the term of this patent is extended or adjusted under 35 U.S.C. 154(b) by 488 days.

(21) Appl. No.: 11/923,980

(22) Filed: Oct. 25, 2007

(65) Prior Publication Data
US 2009/0112734 A1    Apr. 30, 2009

(51) Int. Cl.
*G06Q 30/00*    (2006.01)
(52) U.S. Cl. .................................................. 705/26
(58) Field of Classification Search ............. 705/26, 705/27
See application file for complete search history.

(56) References Cited

U.S. PATENT DOCUMENTS

| | | | | |
|---|---|---|---|---|
| 6,167,383 A * | 12/2000 | Henson | ......................... | 705/26 |
| 6,496,744 B1 * | 12/2002 | Cook | .......................... | 700/95 |
| 6,954,734 B1 * | 10/2005 | Kuelbs et al. | .................. | 705/26 |
| 7,209,892 B1 * | 4/2007 | Galuten et al. | ................. | 705/26 |
| 7,386,800 B2 * | 6/2008 | Moskowitz et al. | .......... | 715/760 |
| 2002/0035697 A1 * | 3/2002 | McCurdy et al. | ............. | 713/200 |
| 2005/0211768 A1 * | 9/2005 | Stillman | ...................... | 235/381 |
| 2006/0047547 A1 * | 3/2006 | Ekker et al. | ..................... | 705/8 |
| 2008/0140537 A1 * | 6/2008 | Powell | ......................... | 705/26 |

OTHER PUBLICATIONS eCollege, "eCollege(R) Releases eCollege Content Manager" PR Newswire, Jan. 11, 2005.*

* cited by examiner

*Primary Examiner*—Yogesh C Garg
*Assistant Examiner*—Matthew Zimmerman
(74) *Attorney, Agent, or Firm*—Blakely Sokoloff Taylor & Zafman LLP

(57) ABSTRACT

Techniques for providing software as a service for enterprise entities are described herein. In one embodiment, a first interface is provided to allow a client to browse over a network a plurality of standard content to be selected to use in one or more software applications used by the client, where the standard content is listed in one or more catalog and each catalog corresponding to a particular industrial usage. A second interface is provided to allow the client to subscribe a service of one or more specific categories selected from the standard content available via the first interface for a predetermined period of time, wherein during the predetermined period of time, the client can select one or more standard content from the subscribed categories and deploy the selected standard content in a system of the client without additional cost. Other methods and apparatuses are also described.

5 Claims, 14 Drawing Sheets

FIG. 8B

Business Configuration: MRV v.1.0

[1] Company Profile — [2] High-Level Solution Scope — [3] Detailed Solution Scope — [4] Services

Content Marketplace | Home | Search ▼ | Content

| | My Account | MRVcars |
| | 🔍 Type in phrase to find |

🛒 Basket    Wish List    Help

My Reference Contents — 845
- Shop floor paper with barcode
- Cash Flow Statement
- Specific Nut Component Contract

Open Request
Cash Flow Statement — 840
more...

Submitted Request
Car Return Contract — 841
more...

Confirmed Request
Sales Order Quote for Consumable Products (CPG) (form)
Quote Price Analysis over Last 12 Months (report) — 842
more...

Closed Request
Nut Component Specification — 843
more...

---

Create Service Request

Please write your requirements, we will contact you after receiving the application.

Request Item 1 — 825

* Request Name: Create Contract Form — 826
* Request Type: Form ▼
* Request Type: Contract Form
* Description: Hi, we want a contract form which fits our company better. I chose a form as reference please help on providing one.

Reference: Specific Nut Compo ▼ — 827
Form Type: Print Form ▼
Text Language: English ▼ — 828
Expected Price: € 500-1000 ▼

Application: Supply Chain Mgt. ▼
Page Size: A4 ▼
Priority: Very High ▼ — 829
Expected Delivery Date: 06/03/2006 ▼

☐ Also purchase the configure service

+ Add More Items — 830

📄 Select template (You can select the template on which your request content is created) — 831
📎 Attach File

[ Submit ] — 832    [ Save ] — 833    [ Cancel ]

FIG. 8E

METHOD OF DEVELOPING SPECIFIC CONTENT AND CREATING STANDARDIZED CONTENT FROM THE SPECIFIC CONTENT

RELATED APPLICATIONS

This application is related to co-pending U.S. patent application Ser. No. 11/923,998, filed Oct. 25, 2007, entitled "Content Service Marketplace Solutions".

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods of providing business software services. More particularly, this invention relates to providing operational models for software content services.

BACKGROUND

Software as a service (SaaS) model has been gaining popularity recently in the enterprise computing industry. SaaS is a software application delivery model where a software vendor develops a Web-native software application and hosts and operates (either independently or through a third-party) the application for use by its customers over the Internet. Customers pay not for owning the software itself but for using it. They use it through an application programming interface (API) accessible over the Web.

As a term, SaaS is generally associated with business software and is typically thought of as a low-cost way for businesses to obtain the same benefits of commercially licensed, internally operated software without the associated complexity and high initial cost. Consumer-oriented web-native software is generally known as Web 2.0 and not as SaaS. Many types of software are well suited to the SaaS model, where customers may have little interest or capability in software deployment, but do have substantial computing needs. Application areas such as customer relations management (CRM), video conferencing, human resources, accounting and email are just a few of the initial markets showing SaaS success. The distinction between SaaS and earlier applications delivered over the Internet is that SaaS solutions were developed specifically to leverage web technologies such as the browser, thereby making them web-native.

There have been several SaaS providers in the market. For example, Saleforce.com provides customer relationship management (CRM) for the sales driven companies in the same model. Microsoft provides a complete software stack: Microsoft Office for desktop processing, Windows as the operating system and Microsoft Dynamics for the business applications through the Office LIVE, Windows LIVE as well as Dynamics LIVE initiatives.

However, as a result of continuous requirement, new or existing customers will continuously require new content. Sometimes a service or content provider cannot pre-produce all the required content within a standard release to fulfill all customers. Chances are that the required content is not available, either in a service marketplace or a standard release. Customers want to modify the content in the service marketplace or the standard content (e.g., adding a logo, changing the font size of a certain form). Demands as these will lead to on-demand content requests. When the bottleneck of handling on-demand requests is reached, certain customers may lack resources or know-how to develop and maintain on-demand contents. Work of small amount translates into high total cost of ownership (TCO) if the customers choose to learn and develop the content themselves. In addition, there has been a lack of platforms for a customer to browse, test, try, download, install, maintain, and purchase content services from a content/service provider.

SUMMARY OF THE DESCRIPTION

Techniques for providing software as a service for enterprise entities are described herein. In one embodiment, a first interface is provided to allow a client to browse over a network plurality of standard content to be selected for use in one or more software applications used by the client, where the standard content is listed in one or more catalog, each catalog corresponding to a particular industrial usage. A second interface is provided to allow the client to subscribe a service of one or more specific categories selected from the standard content available via the first interface for a predetermined period of time, wherein during the predetermined period of time, the client can select one or more standard content from the subscribed categories and deploy the selected standard content in a system of the client without additional cost.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 8A-8E are screen shots illustrating an example of graphical user interfaces of a content marketplace according to certain embodiments of the invention.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a disturbed approach is utilized to reach small and midsize enterprise (SME) customers, who will selectively adopt content delivered by a content and/or service provider. The content can be Best Practice packages available from a pre-produced repository of the content/service provider, or customized packages form by select-to-use content. Standard content provides distinct low cost, which is the focus of midsize market customers. During a valid subscription period, a customer can subscribe updated content according to its needs. An additional subscription takes place when a business plan is changed. Meanwhile, the content will be updated and stay relevant. A new customer will save the hassle of implementing generic content. A continuous and close feedback loop tailors standard release portfolios according to market requirements which are based on the trend of customer content requirements and the content/service provider's expectations.

Thus, while a content/service provider is focusing on standardized country, industry, as well as requestor-specific requirements (e.g., make-to-order or on-demand), the content/service provider needs an industrialized service center to consistently provide low-cost pre-defined content and remote service to customers, partners, and the content/service provider internal, including field and development.

Figure 1A:
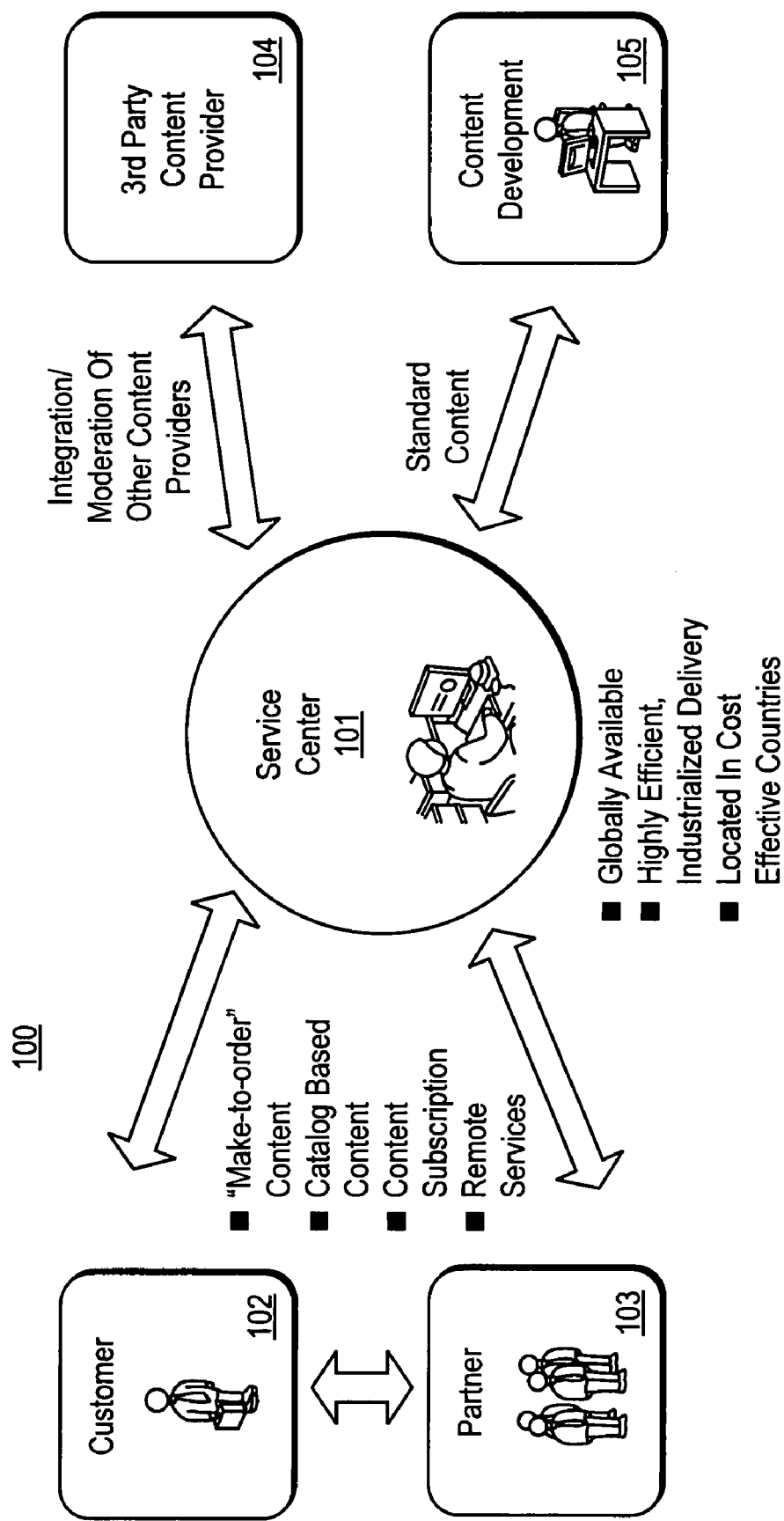
FIGS. 1A-1B are block diagrams illustrating an example of content service configuration according to one embodiment of the invention.

FIG. 1A is a block diagram illustrating an example of content service configuration according to one embodiment of the invention. Referring to FIG. 1A, a service center 101 of a content/service provider is used to provide services including content services and remote services to one or more customers 101 over a network. The network may be part of wide area network (WAN) such as the Internet, a local area network (LAN), a metropolitan area network (MAN), or a combination thereof. Service center 101 provides an industrialized content service infrastructure that is able to continuously provide high quality and cost effective services remotely to customers 102, partners 103, third-party content providers 104 and local content development networks or communities 105. Content services may be delivered on-demand (also referred to as "make-to-order"), catalog-based, and by fee-based subscription. Remote services may be delivered together with other agents that provide onsite support when needed. This configuration focuses on standardized country and industry content as well as requestor-specific requirements (e.g., make-to-order). Partners 103 and third party content providers 104 may use and complement services provided by service center 101.

Figure 1B:
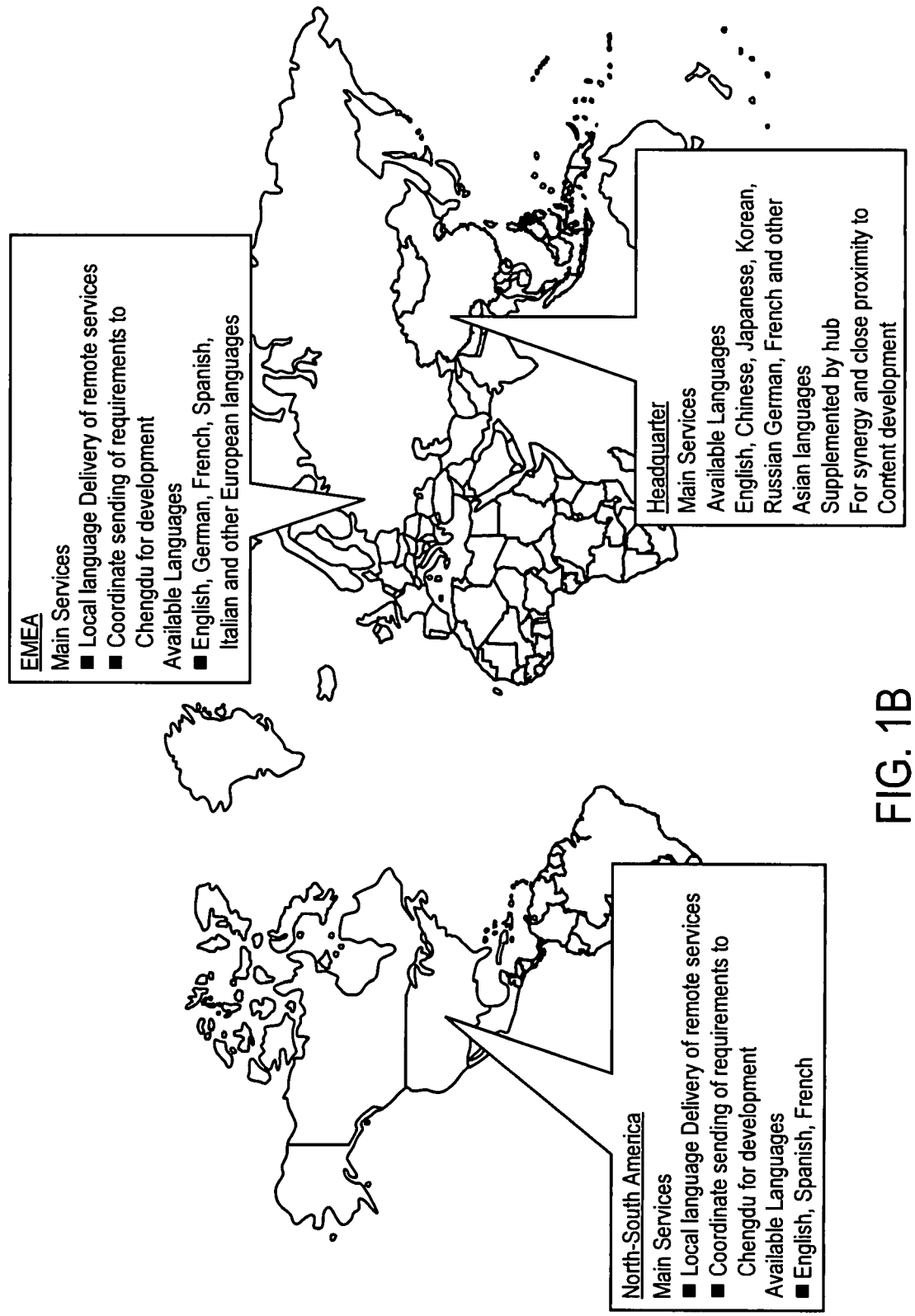

In one embodiment, the service center 101 may include a main or central service center (e.g., headquarter) and one or more regional area centers that may be geographically located all over the world. Service center may provide highly efficient, industrialized content delivery and may be located in cost effective countries or regions, for example, as shown in FIG. 1B. With a central office and one or more regional centers, the service center can provide global services to its customers. The service centers located at regional hubs and diverse country locations can provide onsite and local language support for deliverables from and inputs to the central office. For remote services with high portion of oral communication in local languages, when such staffs are not available in the main service center, they will be provided directly from the regional service centers.

As a result, there is a cost efficient option for customers and/or partners to offshore standard and tailored content build efforts. In addition, there is a quick turnaround time for requested content through a high degree of productization, specialization, and global availability. Further, there is a guaranteed quality and up-to-datedness, support through additional services. On the other hand, for a content/service provider, there is an additional revenue opportunity by turning content into a service. There is a global reach to the customers at a low cost through the strengthening of remote services for volume business. There is also a content back office for the field and support organization. Further, there is an outside-in feedback loop to tailor the content/service provider's content portfolio to market requirements.

Figure 2:
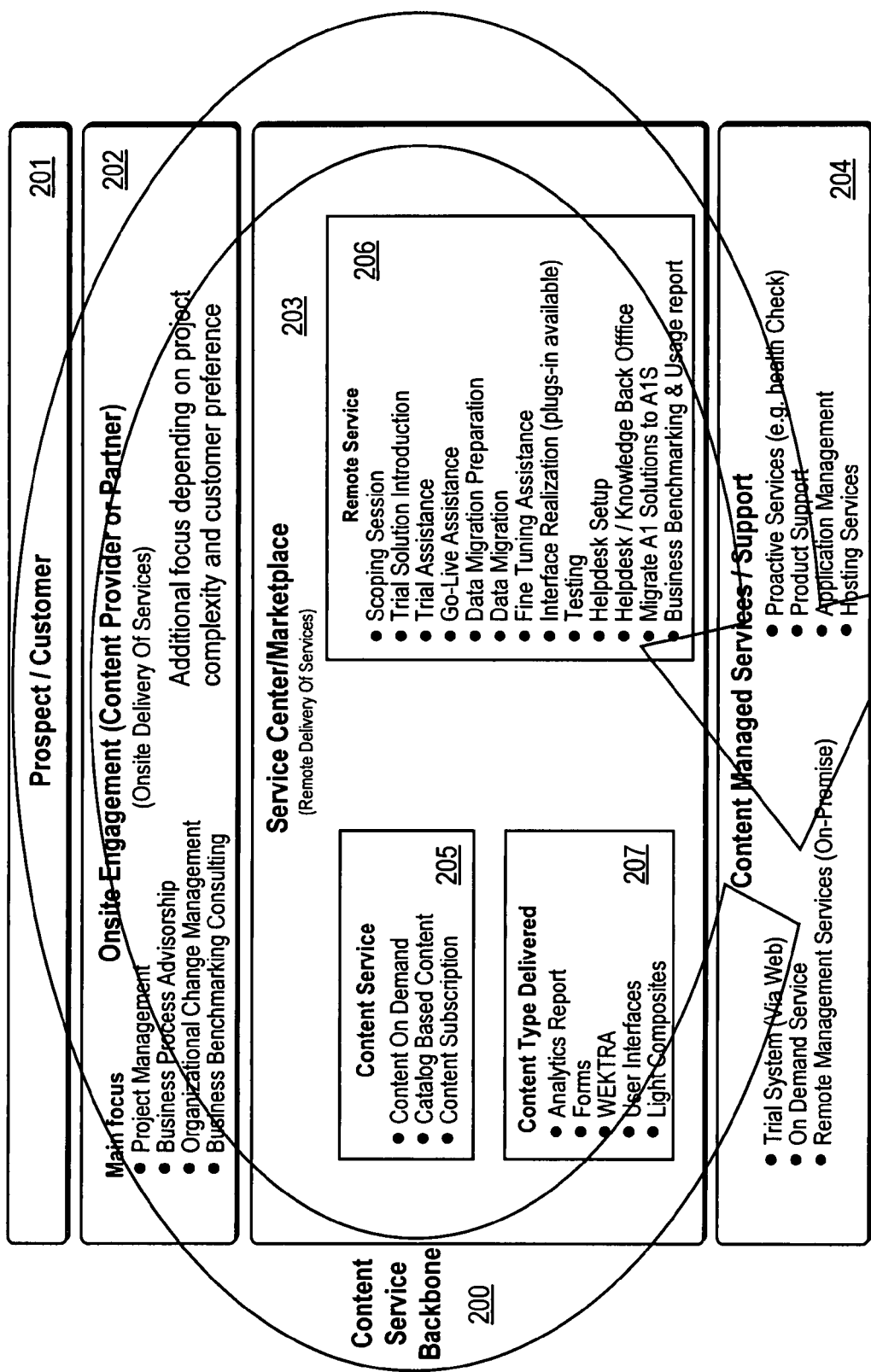
FIG. 2 is a diagram illustrating an infrastructure of content service models according to one embodiment of the invention.

FIG. 2 is a diagram illustrating an infrastructure of content service models according to one embodiment of the invention. For example, system 200 may be implemented as part of service center 101 of FIG. 1. Referring to FIG. 2, system 200 includes an onsite engagement unit 202, which may include certain content providers (e.g., third party content providers or development partners) to provide upfront services (e.g., onsite or regional) to customers 201, service center (including content marketplace) 203, and content management services/support unit 204.

In one embodiment, the onsite engagement unit 202 may be part of regional service center located locally with respect to certain customers to be serviced. The onsite engagement 202 is designed to perform certain operations that are associated with certain customers, including project management, business process advisory, organization change management, and business benchmarking consulting, etc. The onsite engagement unit 202 may perform additional tasks dependent upon the project complexity and customer preferences.

Service center 203 is configured to provide content services to the onsite engagement unit 202, including content services 205 and remote services 206. Content services 205 may include on-demand content, catalog-based content, subscription-based content, which include a variety of types 207 including analytical reports, forms, user interfaces, etc.

On-demand content is referred to, during new content implementations, or when business changes occur during usage, customers may require new forms, reports, configuration or modifications to existing content. Modifications also occur when customers want to customize any standard content obtained from the service marketplace (e.g., part of service center 203) for their needs. A content/service provider provides content on-demand service through a content factory (e.g., part of unit 204) to help customers meet these development efforts. Customers specify required modifications or new content, and the content factory delivers such content together with related knowledge transfer material.

Catalog-based content is referred to in situations where new and existing customers may require standard content such as forms, reports, etc, to meet generic business needs. They want standard content without taking any subscriptions.

To help these customers get required content, a content/service provider lists all content into a content catalog on the service marketplace, and classifies them into different categories for easy browsing. Customers choose the most suitable standard content. This service also caters to customers with need for diverse standard content, and customers who only require small quantities of content each time.

Subscription-based content is referred to herein in situations where new and existing customers of AIS may require content such as forms, reports, etc that may be generic across their industry and/or function. Business changes are often generic and affect everyone. A content/service provider offers customers an option to subscribe to content updates to avoid wasting resources making generic changes. Whenever new content becomes widely adopted, the content/service provider will create and make them available to all current subscribers as standard content. As their business changes, additional subscriptions may be taken to ensure required content used is updated and relevant. For new customers, content subscription saves the hassle of implementing generic content.

Referring back to FIG. 2, remote services 206 may include various types of services, such as, for example, a scoping session, trial solution introduction, trial assistance, go-live assistance, data migration preparation, data migration, fine tuning assistance, interface realization, testing, helpdesk setup, helpdesk/knowledge back office, migration from one solution to another solution, and/or business benchmarking and usage report, etc.

During a scoping session, decision makers, key users, and If administrators of a customer or client are guided in intensive, hands-on workshops and sessions by solution engineers through the process of detailed scope selection in which the scope for the customer's enterprise application solution is defined. During the workshops, results from high-level scope selection are reviewed and verified; the company's organizational structure is set up; and information about any remaining requirements, such as hardware sizing, delta requirements, data migration, and integration with third-party systems is gathered. Delta requirements are verified by the back office. Additional requirements for content on demand are negotiated with the content factory and services are selected by the prospect customer or client based on the prospect's needs.

During a trial solution instruction phase, the prospect will be taken on a guided tour through his personal demo system. During this guidance the prospect can obtain more additional information on the enterprise application solution such as its implementation approach or to jointly continue the evaluation of the enterprise application solution.

With trial assistance, the prospects receive expert guidance and a dedicated contact person to exploit the full set of benefits they obtain with an AIS trial solution. This service includes: joint elaboration of an approach on how to leverage the trial solution; coaching decision makers and key users in working with the trial solution; handling of questions that might arise during the use of the trial solution; optional support of classifying, specifying and evaluation of delta requirements by back office/content factory. However, this process of decision making may be accelerated. All or some of the scoping and fine-tune decisions and results are carried forward to go-live.

With go-live assistance, an expert from the content/service provider will guide and support execution of the final activities before a customer uses the enterprise application solution in production. This includes supporting and coaching activities like finalizing end user documentation, readiness checks, cutover, etc.

Data migration is a central topic for customers when deploying an enterprise application solution. The data migration preparation supports customers to prepare for data migration, including introduction of the data migration approach and respective tools for data mapping and data import embedded in the enterprise application solution; coaching of development of Data migration strategy (e.g., which data from which systems, which periods of time, historical data, etc.); coaching of evaluation of data conversion requirements (e.g., which data how to convert); and support of compilation of an overall data migration concept and plan (e.g. including data cleansing of legacy system data by the customer and converting and filling data into data import sheets by the customer).

Data migration service covers data load of data provided in the data import sheets as well as support for resolving problems occurring during data load. The data import sheets are embedded in the enterprise application solution and are filled with respective data by the customer, i.e. data extraction, data cleansing, data conversion/mapping and filling of the data import sheets are not included in the service.

Fine tuning can be described as a set of activities that a customer must perform in order to adjust the customer's enterprise application solution system to its specific business needs. Fine Tuning is based on the results of the scoping process described above, in which the customer determines what processes, functions and features the customer would like to implement. With the fine tuning assistance service, customers have an option to have an enterprise solution expert from the content/service provider to guide and support execution of fine tuning. The fine tuning assistance service can cover the adoption of existing forms, reports, user interfaces and configuration parameters.

The interface realization service makes sure, that the enterprise application solution works with third party solutions the customers has in place and for which plug-ins are available. This includes deployment of available plug-ins, i.e. setup of connectivity and synchronization. Support of definition of mapping & conversion rules, testing of interface and check of data consistency. An expert can guide and support testing in the go-live phase during the necessary test activities and embedded test tools: planning, execution and monitoring.

The helpdesk setup service assists customers in setting up their company-internal help desk, in which key users take care of support requests posted by the end users. The enterprise application solution contains detailed examples and knowledge transfer material on how to set up their help desk. However, if required, this service provides customers with access to an expert who will address customer specific questions and arrange a tailored proposal for help desk setup. The helpdesk/knowledge back office handles customer/partner non-defect calls; respond to customer feedback, such as defining content requirements, change requests and removal of errors in solution content; consult customers during integration of knowledge into WEKTRA contents; and prepare periodic reports on effectiveness and knowledge the transfer desk.

The standard business benchmarking report service provides a customer peer-group specific business benchmarking document to the c-level. It includes peer group median & best-in-class KPI values, comments and explanations, generic peer group trends as well as a link to the relevant section in the service mall for business consulting. Support of this service (technical question, content explanation) is part of standard product support. The derivable actions based on individual analysis enables the target group to: maximize solution usage; optimize customer's business; guide, focus and prioritize SAP solution development; and adaptively analyze new market development.

Figure 3:
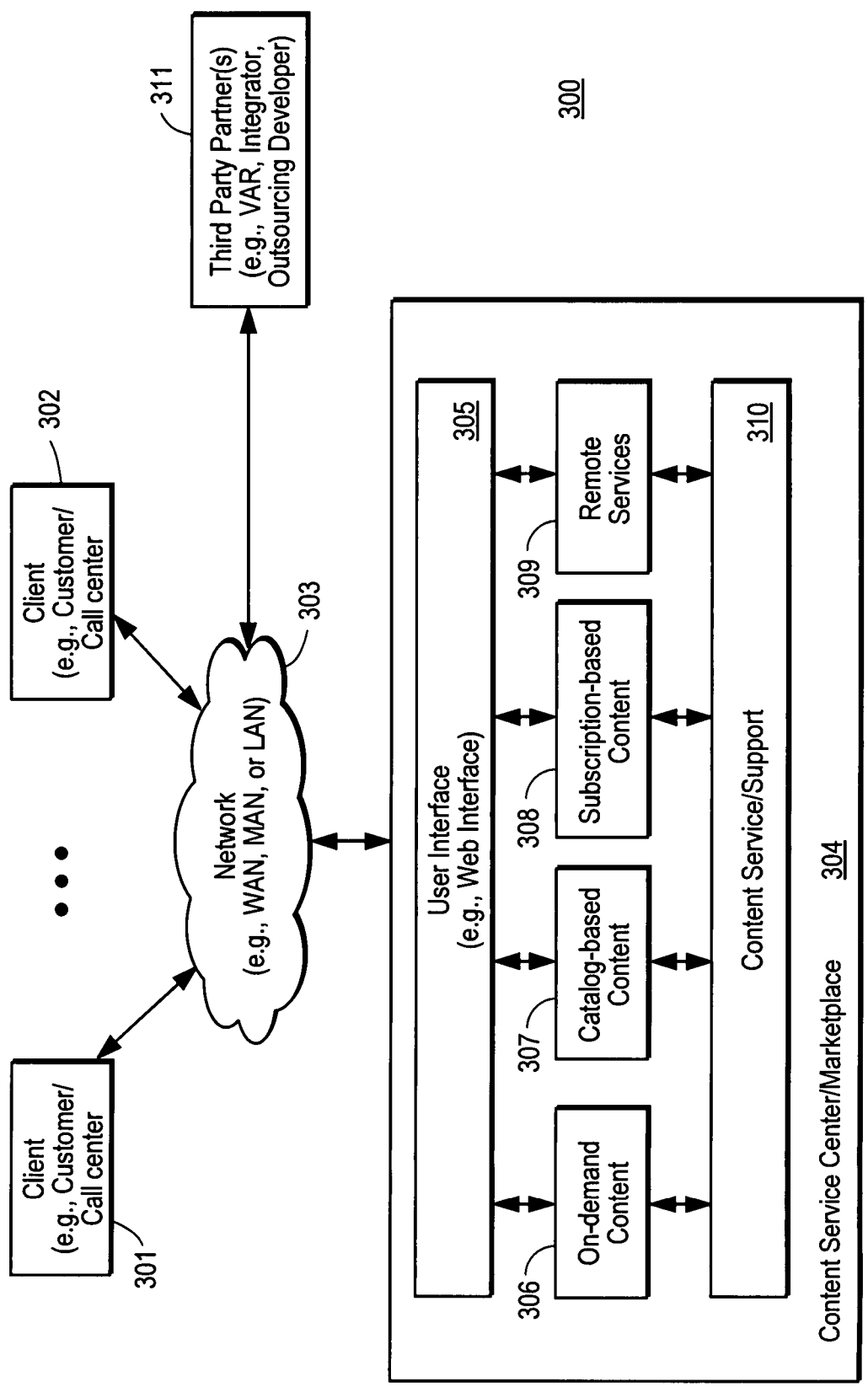
FIG. 3 is a block diagram illustrating an example of system configuration of content service platform according to one embodiment of the invention.

FIG. 3 is a block diagram illustrating an example of system configuration of content service platform according to one embodiment of the invention. For example, system 300 may be implemented as part of system 200 of FIG. 2. Referring to FIG. 3, system 300 includes, but is not limited to, one or more clients 301-302 communicatively coupled to service center and/or content marketplace 304 over a network 303. Clients 301-302 may be customers of a content/service provider hosting the content service/marketplace 304. In addition, clients 301-302 may also be internal personnel of the content/service provider, such as, for example, call center staffs, consultants, maintenance people. Furthermore, clients 301-302 may be part of business partners 311 such as, for example, value added resellers (VARs), third party integrators, and/or third party outsourcing developers, etc. Network 303 may be a variety of networks such as WAN, LAN, MAN, or a combination thereof.

Service center/marketplace 304 may be implemented as part of service center/marketplace 203 of FIG. 2, which may be implemented as a Web server or a cluster of servers. In one embodiment, service center/marketplace 304 includes, but is not limited to, user interface 305 which may be implemented as a Web interface, such as, for example, graphical user interfaces (GUIs) as shown in FIGS. 8A-8B and 9-14, a variety of content services such as on-demand content 306, catalog-based content 307, subscription-based content 308, and/or remote services 309 supported by content service/support unit 310.

As described above, on-demand content 306 is the most generic service provided by service center 304. Customers are encouraged to search available content on marketplace when need. If there is no content available, customers may request an on-demand service for specific content. Content on demand provides customers with tailored solution content for a wide variety of content types on demand, meeting their specific business requirements. Content provided to customers is delivered with related knowledge transfer material. Maintenance for the content is included as well. Content types include, but are not limited to, new reports, adapted reports, new forms, adapted forms, built-in knowledge environment, adapted UIs, and field extensions. The customers must be able to adapt and enhance the solution to meet their individual business requirements. If the customer desired content is not available in the existing deliverables, the customer can request on-demand content service, through the service center, to meet their specific business needs.

Figure 7:
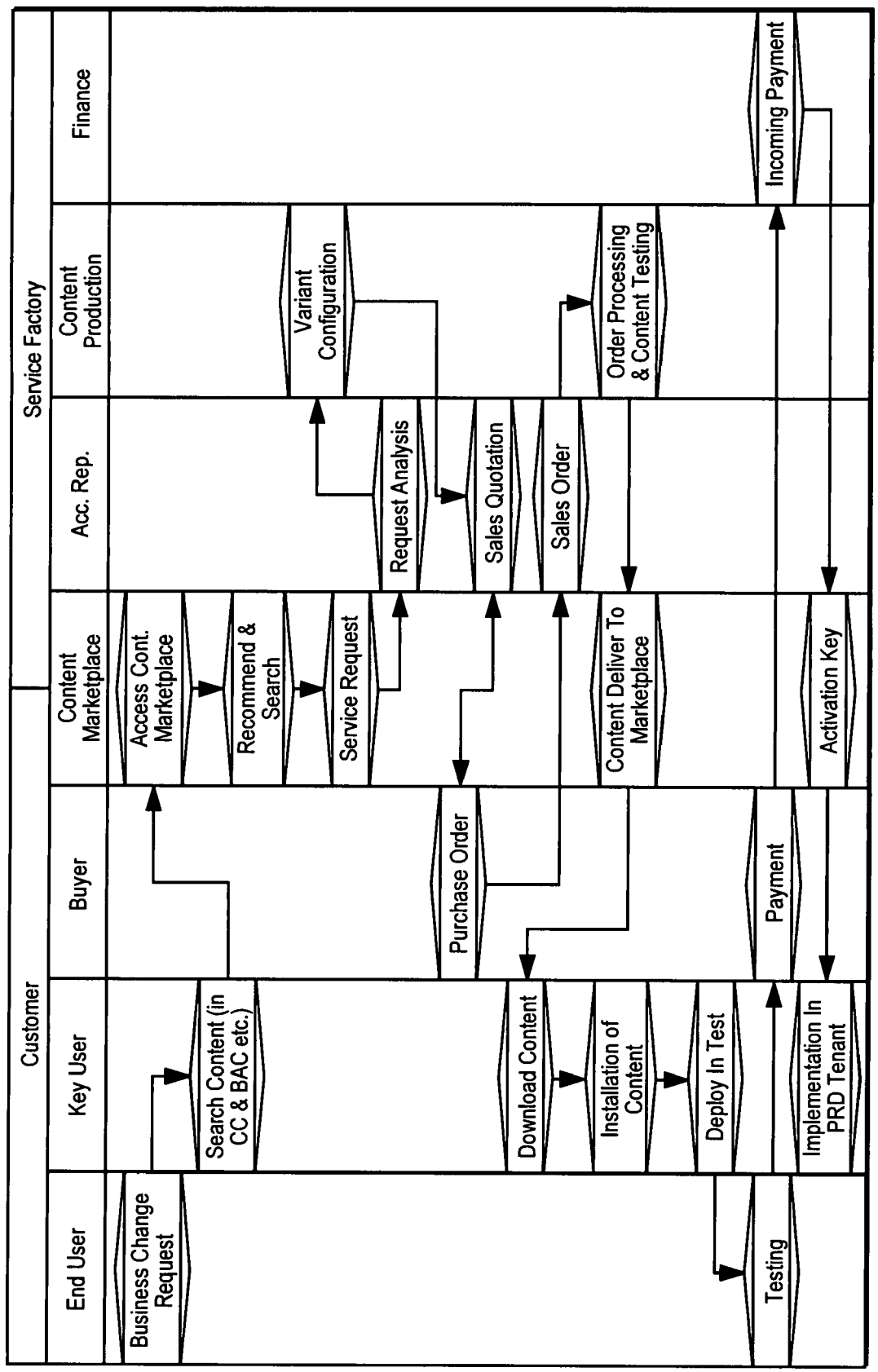
FIG. 7 is a flow diagram illustrating a process for providing content services according to one embodiment of the invention.

As shown in FIG. 7, the on-demand content process is triggered when a customer submits a request. When new business requirements of customers arise and customers fail to find a solution in the standard content, then they can initiate a search for content in the content marketplace. If they also failed to find suitable content, they can create corresponding on-demand content requests. The service center generates a sales order according to the quotation signed by the customer and organizes the process of development and testing. After developing and testing the content, it can be packaged and delivered to the customer. Then the customer can implement the content in the customer's enterprise system.

Specifically, referring to FIG. 7, when an on-demand request is received, service delivery management personnel will contact the customer to understand requirements upon receipt of service request. Once the requirements are confirmed, a requirement list is generated. A service advisor verifies the requirement list, before the service delivery management generates a quotation for the customer. When the customer is satisfied with the price, a purchase order will be generated for confirmation. Upon confirmation of purchase order, a sale order is generated. The service advisor receives the sales order and runs planning tools to book resources and reconfirm date of delivery. Once the delivery dates are confirmed, production orders are released to project development leads. Based on the production order, the project leads will assign specialized developers to each individual task. Developers work on their tasks once task pre-requisites have been fulfilled. Information developers will create knowledge transfer materials for delivery to the customer. Once development is completed, the project leads will upload the content and documentation into content repository. Thereafter, a notification will be generated to inform the customer to download the content. Finance will follow up with the invoicing upon good receipt. The customer will receive recommendation and implement the delivered content in the system. The customer's on-demand request history will be updated.

Catalog based content 307 is productized content that is priced individually on the market place. There will be no modification for catalog based content in its implementation, similar to a "take it or leave it" model and this is the basis for subscription. Catalog based content service provides customers with pre-produced customized content in the content marketplace. A content/service provider lists all content available into a content catalog on the content marketplace and classifies them into different categories for easy browsing, searching. Customers choose the most suitable standard content they need, and purchase it with easy content logistics. This service also caters to customers with need for diverse standard content, and customers who only require small quantities of content each time. When a new business request is raised, a key user can try to find a solution in an end user's system. If the customers can not find content in the standard content that fulfill their business requirements, the customers can access the content marketplace for further search. Content can be searched via key-words and the following criteria:

Country
Industry
Language
Content type
Content provider
Price (as a filter criteria)
BAC (Business Adaptation Catalog)

After the customer downloads catalog based content, sales order and billing will be triggered. Service Center provides the selected content. A customer can test the content without charge in test tenant and finally deploy the content in customer's system with authorization data which delivered by service center after payment. Some maintenance service can be provided after the deployment, for example, as shown in FIG. 7.

Subscription services will provide the customer the least spending on the most available content within a certain period of time such as 12 months. Certain portions (e.g., 80%) of catalog-based content may be available for customers who enroll in annual subscription. Customers need to renew the subscription every certain period of time such as 12 months. According to certain embodiments of the invention, the content/service provider continuously provides updates for existing content and/or adds new content for every industry, function and country defined in content marketplace. Updates and new content may be developed in response to business changes, so they will be relevant to all customers using content in the relevant area. Customers with valid subscriptions will receive updates and new content in their relevant area. Subscription is one kind of content service offered by the service center. When a customer is interested in certain business solutions existing in the service center catalog, they can ask for catalog based subscription content service. Having paid for the subscription, customers can download and deploy corresponding content for free within the period paid.

Specifically, for example, a content standardization committee confirms additions to standard content. The content will be classified into one or more categories such as, for example, industry, function, and/or country. Cross classification may be implemented. A customer with a subscription authorization can search content marketplace and find a recommendation for the associated subscription. After the customer confirms, a sales order will be generated and then billing, online payment and change customer account profile may be performed. Once the customer subscribes content successfully, a notification will be sent to the customer and then the customer can implement relevant content in the customer's system. Any customer with a subscription containing a specific classification will be notified about the updates associated with that specific classification. Customers can decide for themselves whether to implement the update. Customers without valid subscriptions, but with content in the same classification, will be notified of the updates. They will need to order a new subscription if they want that content update. After subscriptions expire, customers continue to use whatever content received earlier, but will not get further updates. Once subscriptions expire, customers cannot add any content provided by the content/service provider, even if that content was available during the subscription period. Content specific to a particular industry may be bundled into a specific Best Practice package. Content specific to a particular function may be bundled into function-based Best Practice packages. Country specific packages may be divided into function-based or industry-based, and are sold as separate country add-on packages. Customers may also mix and match individual content, and all the selected content will be bundled into customized packages. Customized packages are categorized according to the number of content it contains, with packages in each category having the same number of content. As the number of content in the customized packages increase, the unit price per content will decrease.

Remote service may be charged on a case-by-case basis. Internally each incident may include several unit services and more complicated remote services may require more unit services. For example, each unit service hour is 30 minutes. Furthermore, brokering service may also be provided in which quality control personnel may check content developed by partners who will be able to sell on the content marketplace. A partner may have to pay a commission for each transaction.

Referring back to FIG. 3, partners 311 may include VARs or agents which can order content for their customers in their specific work center on marketplace with tools to support them to do content business. VAR/agent partners may receive certain percentage (e.g., 30%) commission on selling catalog based content 307, subscription-based content 308, and remote service 309. VAR/agent partners may also receive certain percentage (e.g., 15%) of commission on selling on-demand content 306. VAR/agent partners share the volume of customer requests and provide faster responses to the customers. In fact, more educated partners may reduce the service cost of service center 304. How to sell content on content marketplace may be part of the partner readiness programs.

In addition, partners 311 may include third party integrators which may provide additional content that is out of the content/service provider's scope or capability. The third party integrators may develop additional content based on the standard catalog-based content. The content developed by the third party integrator may be listed in the marketplace after a quality control process which may be charged a processing fee as a commission. However, the third party integrator is responsible for supporting its developed content listed on the marketplace. Further, the third party integrator may jointly develop new content with the service center 304.

Further, partners 311 may include third party outsourcing partners which constitute extended development resource to ensure the service center delivering the same service quality when the requests may exceed the capability of the service center. The service center may leverage the lower cost of outsourcing partners to reduce development cost and improve business margin. The outsourcing partners may need to follow the development processes of the service center. Note that some or all of the components of service center 304 may be implemented in software, hardware, or a combination of both.

Figure 4:
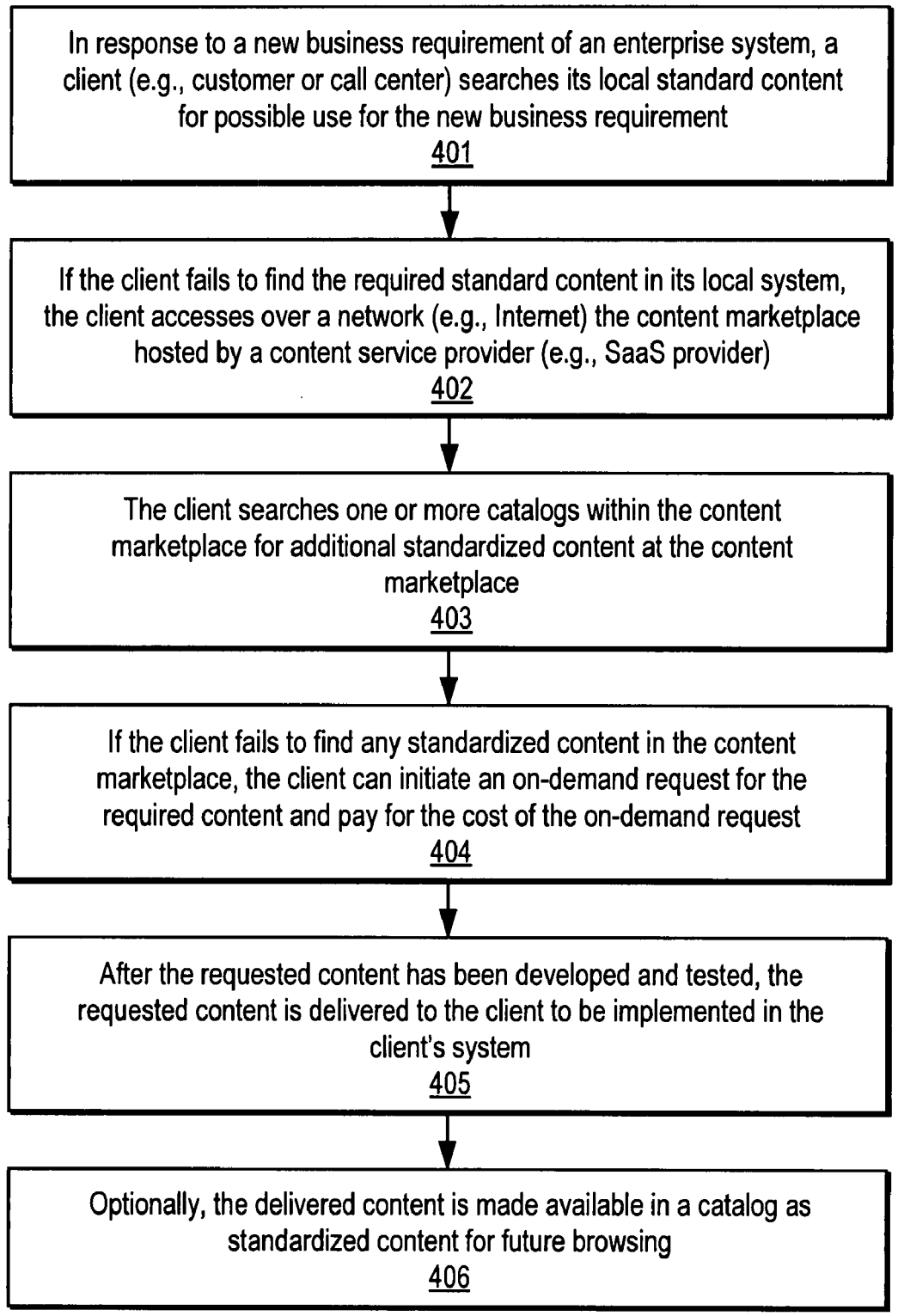
FIG. 4 is a flow diagram illustrating a process for providing on-demand content services according to one embodiment of the invention.

FIG. 4 is a flow diagram illustrating a process for providing on-demand content services according to one embodiment of the invention. Note that process 400 may be processed by processing logic which may include software, hardware, or a combination of both. For example, process 400 may be performed by system 300 as shown in FIG. 3.

Referring to FIG. 4, at block 401, in response to a new business requirement of an enterprise system a client (e.g., clients 301-302 of FIG. 3) searches its local standard content for possible use for the new business requirement. If the client cannot find it, at block 402, the client accesses over a network the content marketplace (e.g., marketplace 304 of FIG. 3) hosted by a content/service provider. At block 403, the client searches one or more catalogs within the content marketplace for additional standardized content available at the content marketplace. If the client cannot find it, at block 404, the client may initiate an on-demand request for the required content and pay for the cost of the on-demand request. After the requested content has been developed and tested, at block 405, the requested content is delivered to the client to be implemented in the client's system. At block 406, optionally, the delivered content is made available in a catalog as standardized content for future browsing. Other operations may also be performed.

Figure 5:
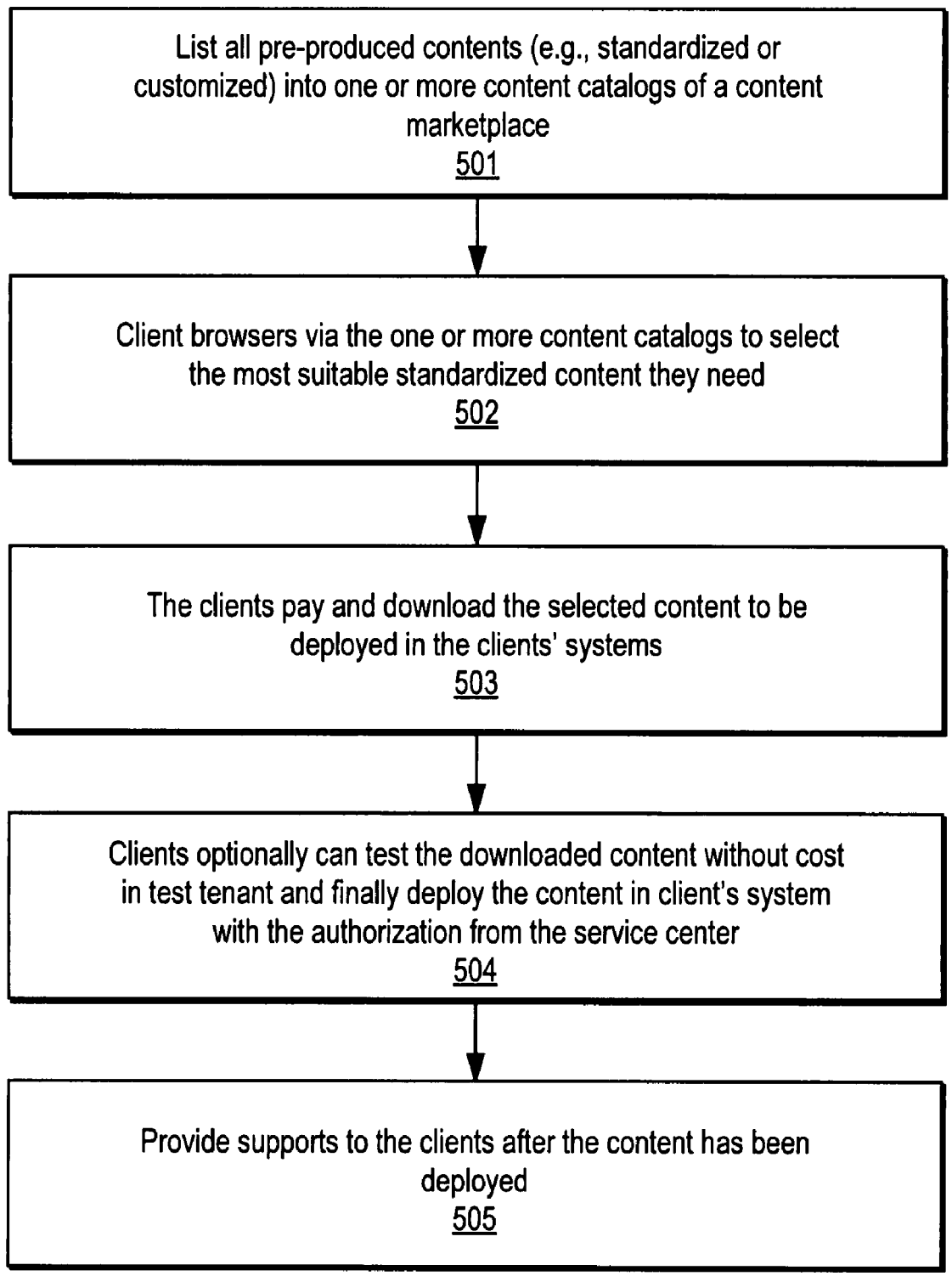
FIG. 5 is a flow diagram illustrating a process for providing content services according to one embodiment of the invention.

FIG. 5 is a flow diagram illustrating a process for providing content services according to one embodiment of the invention. Note that process 500 may be processed by processing logic which may include software, hardware, or a combination of both. For example, process 500 may be performed by system 300 as shown in FIG. 3. Referring to FIG. 5, at block 501, all of the pre-produced (e.g., standard) content is listed in one or more catalogs of the content marketplace. At block 502, clients can browse the one or more catalogs to select the most suitable standardized content they need. At block 503, the clients pay and download the selected content to be deployed in the client's systems. At block 504, the client can optionally test the downloaded content without cost in the test tenant and finally deploy the content in client's systems with the authorization from the service center. At block 505, the service center provides supports to the client after the content has been deployed.

Figure 6:
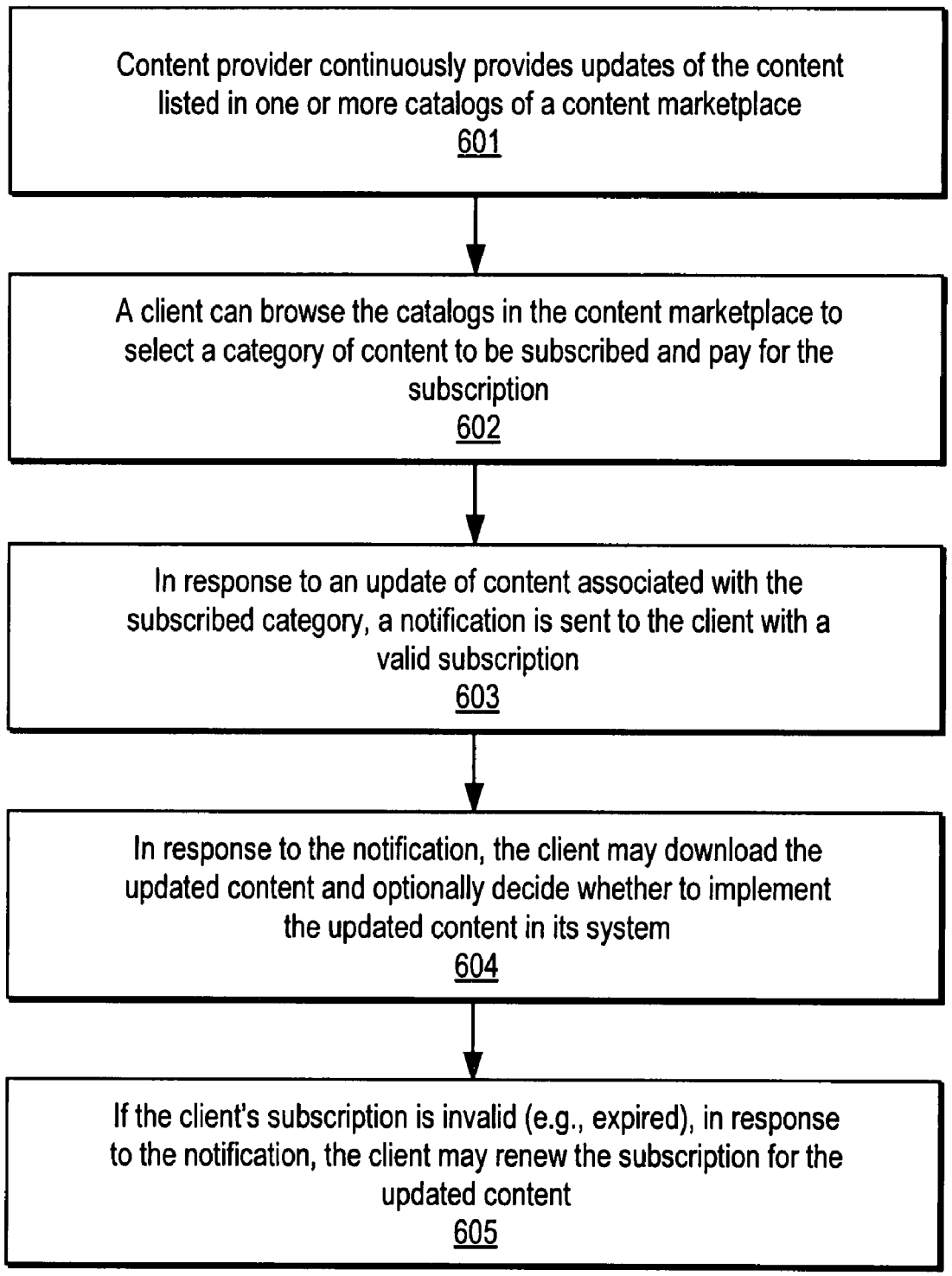
FIG. 6 is a flow diagram illustrating a process for providing content services according to one embodiment of the invention.

FIG. 6 is a flow diagram illustrating a process for providing content services according to one embodiment of the invention. Note that process 600 may be processed by processing logic which may include software, hardware, or a combina- tion of both. For example, process 600 may be performed by system 300 as shown in FIG. 3. Referring to FIG. 6, at block 601, a content/service provider continuously provides updates of content listed in one or more catalogs of a content marketplace. At block 602, a client can browse the catalogs in the content marketplace to select a category of the content to be subscribed and pay for the subscription. At block 603, in response to an update of content associated with the subscribed category, a notification is sent to the client with a valid subscription. At block 604, in response to the notification, the client may optionally download the updated content and decide whether to implement the updated content in its system. At block 605, if the client's subscription is invalid (e.g., expired), in response to the notification, the client may review the subscription for the updated content. Other operations may also be performed.

As described above, an online service center/marketplace provides an integrated online e-business platform for customers to browse, test, try, download, install, maintain and purchase content service from the service center for their enterprise solutions to implement their business requirements. On the platform, a customer is able to search for browse, test their yearning or tagging content. The customer is able to see a mock-up of the ordered content in a try-out system. Once the customer decides to build their business specific content, they can find an approach to express-deliver their business requirement easily and accurately.

Thus, content service marketplace is the central online e-business platform which provides intuitive navigation to guide the customer to submit their requirements, search, trial, download, install, maintain and even purchase contents (forms, analytics reports, WEKTRA, etc) and remote service. It provides context-related assistance or contact information when the customer is in the content marketplace. Some searching mechanisms are provided and the customer can easily search content, such as, for example, keyword-based and catalogue-based searching. It provides the customer with a predefined template, tool-based guided questions or forms to fill-in the business requirements, as a wizard in CM to collect customer requirements accurately. The content marketplace displays most or all information in local language (e.g., English, Chinese, Italy, Germany, French, Spanish, etc.) and customized (e.g., inc. number format, currency format, time and date format) automatically in accordance with the user's system settings.

The content's detailed information (e.g., content attributes and attached documents) can be retrieved from a content repository and can be published to the content marketplace. It provides users with functions to add content into download basket, delete content from download basket, to integrate with content repository, for example, to push ITSAM content recommendation for content downloading. The content marketplace has the ability to display content promotion information in the content marketplace, promote a subscription business model via the content marketplace, and promote the most popular and latest content. The content marketplace may further provide recommendations to a user, including recommendations with information base (iBase), recommendations with pre-selected information, recommendations with the customer's behavior, recommendations for relevant content, recommendations for upgrade content, display recommendations, and recommendations for subscription, etc.

Figure 8A:
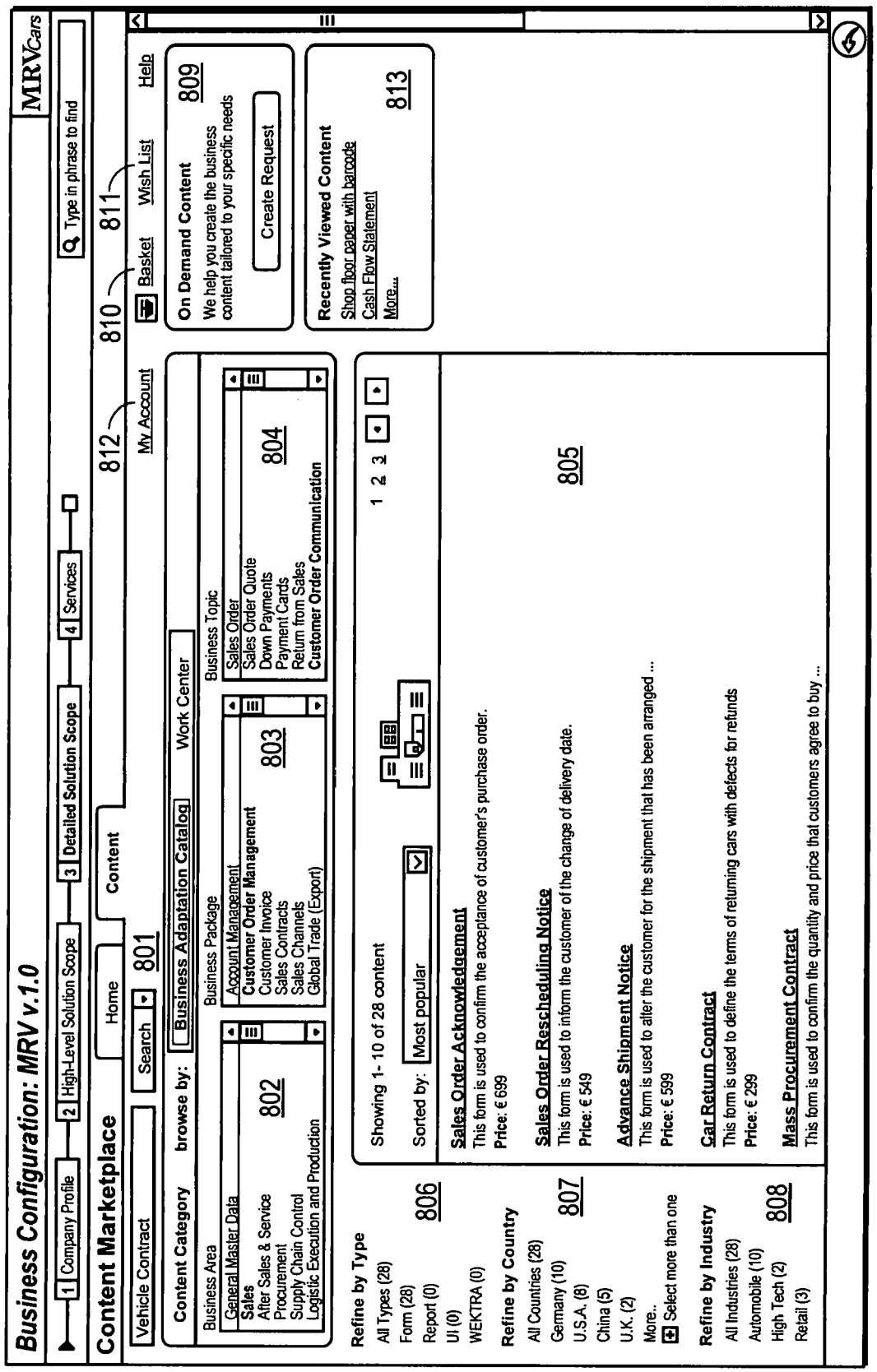

FIGS. 8A-8E are screen shots illustrating an example of graphical user interfaces (GUIs) of a content marketplace according to certain embodiments of the invention. For examples, GUIs as shown in FIGS. 8A-8E may be implemented as part of user interface 305 of FIG. 3. As described above, when a client or customer, which may be an individual customer, a partner, or a call center of a content/service provider, needs additional content in response to a change of business needs, the client typically searches its local content inventory. If the client cannot find the needed content in its local content inventory, the client may access the content marketplace such as content marketplace 304 of FIG. 3. As shown in FIG. 8A, when the client accesses the content marketplace, GUI 800 is displayed to allow the client to browse or request certain services from the content/service provider hosting the content marketplace.

Referring to FIG. 8A, according to certain embodiments of the invention, a variety of content is listed in one or more catalogs 802-804 to be selected to be purchased and downloaded, either individually or via subscription as described above. The listed content may be located by searching one or more keywords via a search field 801. The catalogs 802-804 may be arranged via certain categories and/or subcategories. In this example, catalog 802 may be implemented based on a business area category. For each of the business area categories, there may be one or more business packages listed as subcategory 803. Likewise, for each business package, there may one or more business topics as another subcategory. A client may individually select or highlight any of the content or content categories in any of the fields 802-804, which may be implemented as a list menu, a popup menu or other various GUIs.

In addition, according to one embodiment, when a user selects an item from lists 802-804, content that satisfies the selection may be displayed in display area 805, which may be sorted according to a variety of rules or policies, such as most popular. Furthermore, the content may be refined according to a variety of categories, such as, for example, by type 806, by country 807, and/or by industry 808, etc., as well as the number of content items available for each category. Any of the selected contents can be purchased which will be saved in folder 810 or alternative, if the user is not sure, the selected content can be saved in folder 811 for future usage. The summary of the user account can be viewed via link 812.

If the user cannot find what the user wants, the user may request for an on-demand service as described above. In this example, the user may request an on-demand service by activate button or control 809, which will be described in further detail below. Further, certain content that has been previously viewed by the same user or company associated with the user may be displayed in display area 813.

Figure 8B:
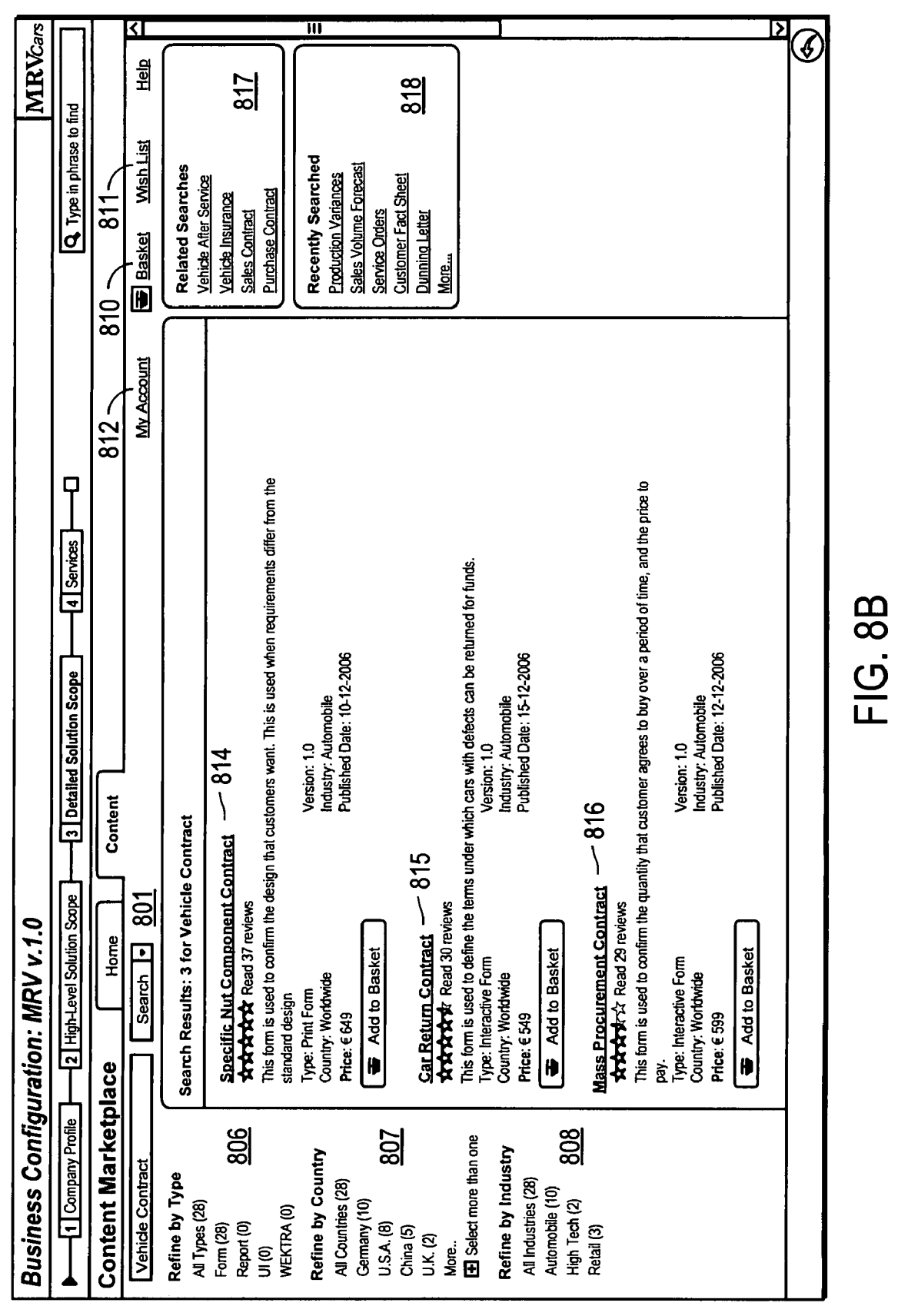

As described above, a user can search certain content listed in catalogs 802-804 based on one or more keywords entered in search field 801. In response to the search, a search result is displayed, for example, as shown in FIG. 8B. Referring to FIG. 8B, in response to one or more keywords entered in field 801, according to one embodiment, a search result is displayed, in this example, including three content items 814-816 that match the searched keywords. Each of the content items in the search result includes a summary of the respective content item. The summary of the content item includes, but is not limited to, a brief description, type, version, industry, country, price, and/or published date of the content item. The summary of a content item further includes reviews or ratings from other users or customers. The summary of the content item further includes a button or control which when activated; the respective content item will be added to folder 810 for purchase or folder 811 for future references. Further, certain related searches of the user are displayed in display area 817 and likewise, certain recent searches of the user are displayed in display area 818 for user to review.

Figure 8C:
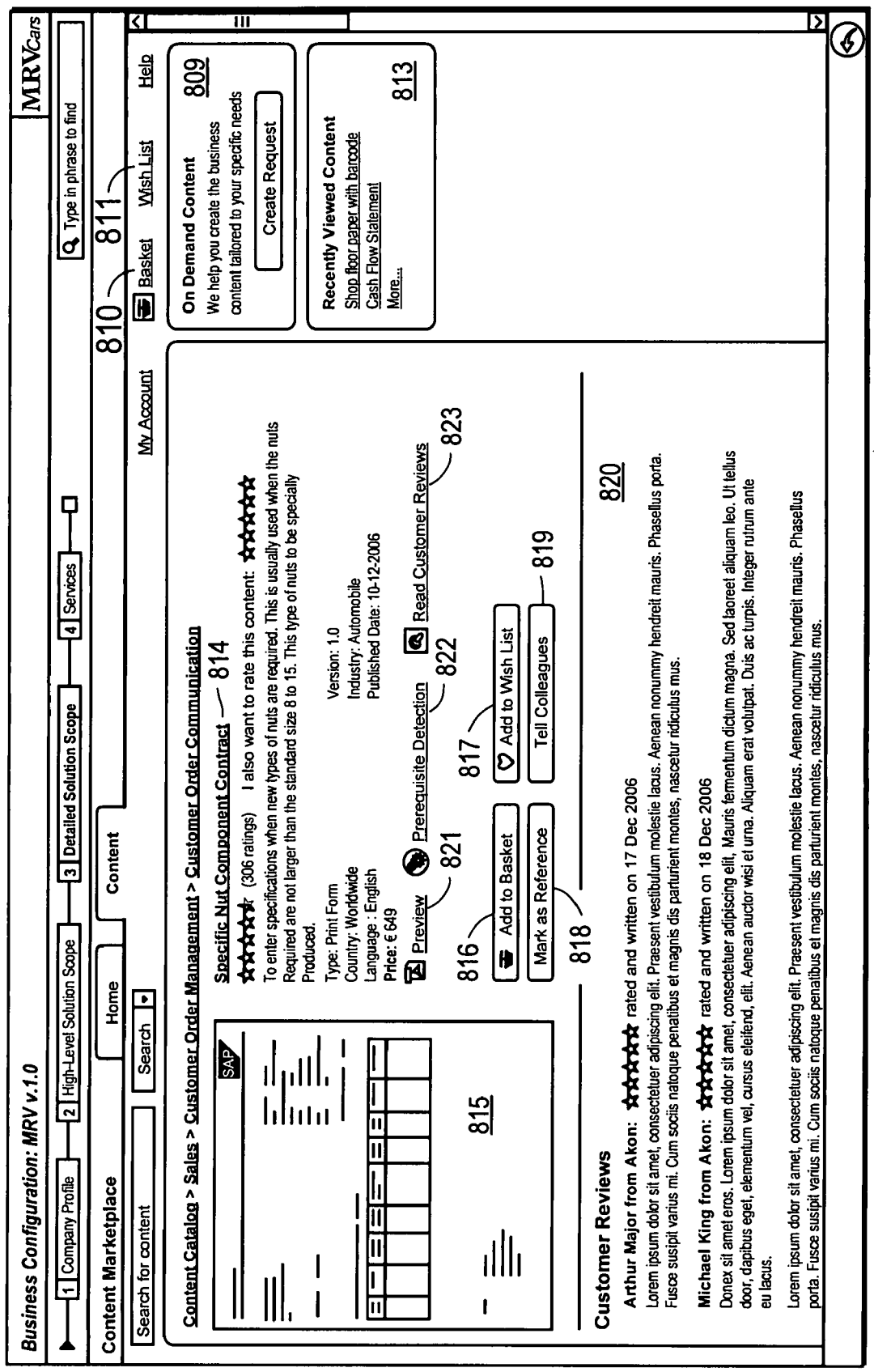

The detailed information regarding each of the content items 814-816 can be displayed via an activation of the corresponding link as shown in FIG. 8C. Referring to FIG. 8C, in this example, additional detailed information of content item 814 is displayed. In addition to the information described above, a thumbnail image of the content item is displayed in display area 815 and a larger version of the image can be displayed via an activation of link 821. The content item 814 may be added to a purchase basket 810 by activating button 816 or alternatively, the content item 814 may be added to wish list folder 811 by activating button 817. In addition, the user may notify (e.g., sending an email) another user regarding this content item by activating button 819. Further, the most recent reviews by other users may be displayed in display area 820 and more reviews can be viewed by activating link 823.

Figure 8D:
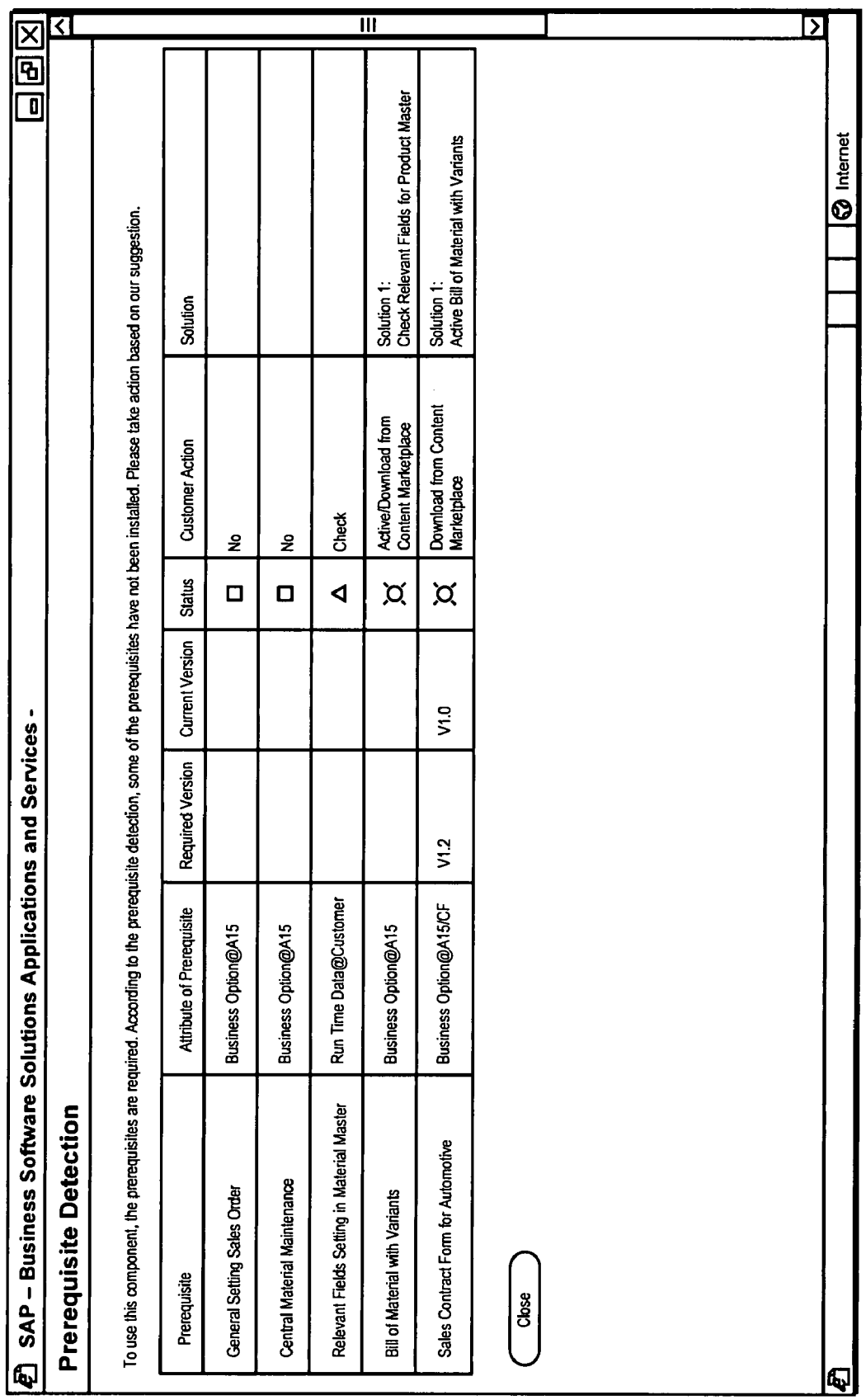

Furthermore, certain prerequisites of the content item 814 may be viewed via link 822, for example, as shown in FIG. 8D. Referring to FIG. 8D, with the prerequisite information displayed, a user can easily estimate whether the user's system meets all of the prerequisites of the content item 814 for deployment. If one or more prerequisites of the content item 914 have not been satisfied, the user may optionally browse the one or more catalogs (as shown in FIG. 8A) to purchase those prerequisites.

Further, the content item 814 may be marked as a reference which may be used to request an on-demand service via an activation of button 809, for example, as shown in FIG. 8E. Referring to FIG. 8E, when a user requests an on-demand service, for example, by activating button 809 of FIG. 8C, an on-demand request form is displayed including a variety of fields to receive inputs from the user. The on-demand request form includes field 825 to allow a user to enter a name for the request for identifying the specific request, which may be shown in display area 840-843 dependent upon the specific situations or stages of the processes. The user may specify a type of content on-demand request in field 826 which may be in one of a variety of types as described above. The user may further specify the content name in field 827 with a brief description in field 828.

In addition, the user may specify one or more options of the on-demand request in fields 829. For example, the user may specify another content item as a reference for the on-demand request, which may be indicated by marking the referenced content item, for example, by activating control 818 of FIG. 8C. Note that all of the marked references may be displayed in display area 845 from which the user may view or select. The user may further specify the type of application in which the request content will be deployed, as well as the form type and size of the page, the language of the content requested, etc. The user may further specify how urgent the requested content is needed by specifying the priority of the requested content and the target delivery date, as well as the target price. The user may further request a service associated with request such as, for example, configuration service or other consulting services.

The user may further select another template for the on-demand request via link 830 and may attach another file or files to the request via link 831. Once the user has completed the request form, the user may submit the request via button 832, where the submitted request will be shown in display area 841. Alternatively, the user may save the request via button 833 which will be shown in display area 840. Previously submitted requests, confirmed by a service/content provider, may be displayed in display area 842. All completed and/or delivered request may be displayed in display area 843. Note that the GUIs as shown in FIGS. 8A-8E are illustrated for purposes of illustration only. Other configurations or implementations may also be implemented.

Figure 9:
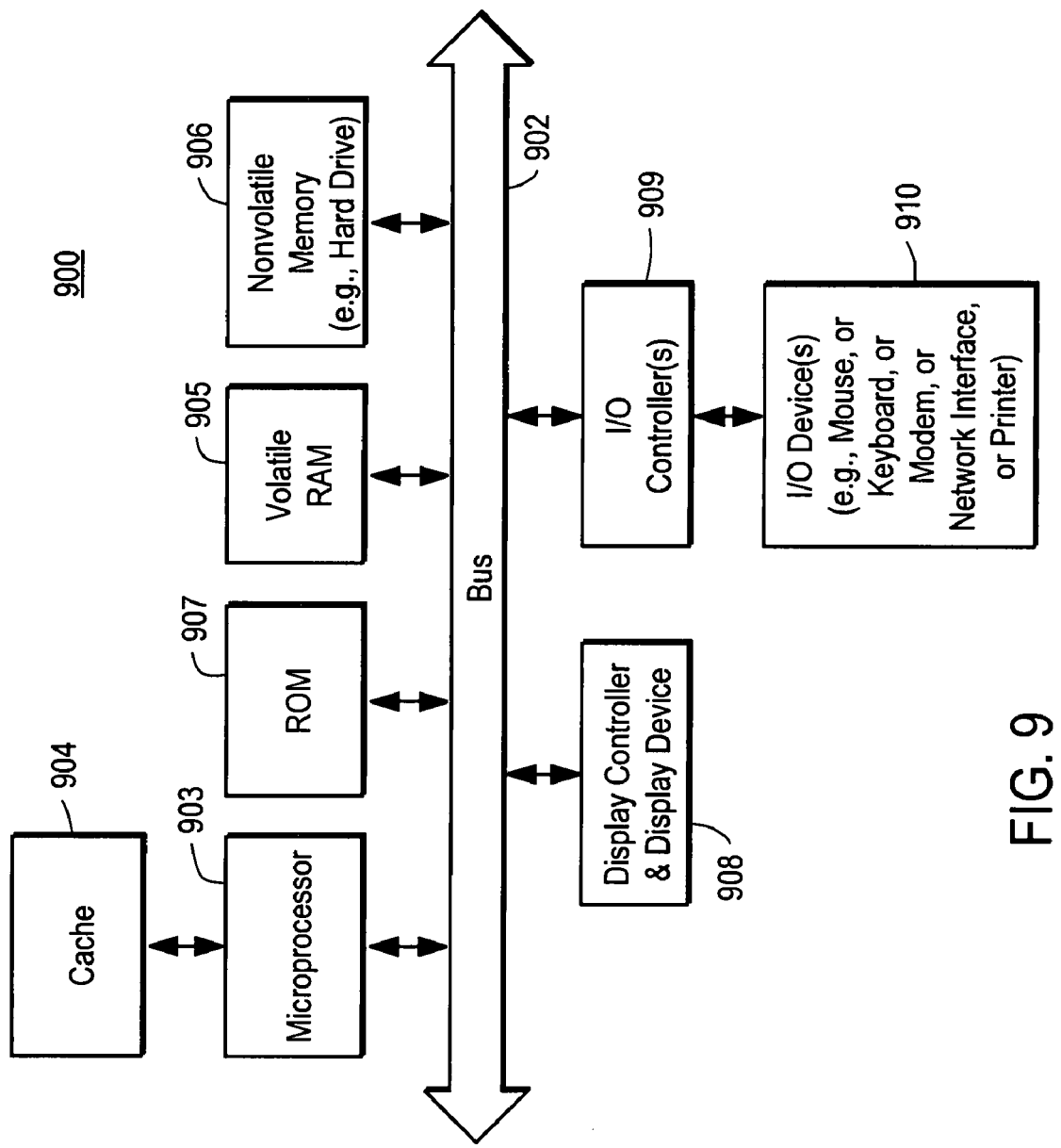
FIG. 9 is a block diagram of a data processing system which may be used with one embodiment of the invention.

FIG. 9 is a block diagram of a data processing system which may be used with one embodiment of the invention. For example, the system 900 shown in FIG. 9 may be used as clients 301-302 or service center/marketplace 304 of FIG. 3. Note that while FIG. 9 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 9 may, for example, be an Apple Macintosh computer or an IBM compatible PC.

As shown in FIG. 9, the computer system 900, which is in the form of a data processing system, includes a bus or interconnect 902 coupled to a processor 903 and a ROM 907, a volatile RAM 905, and a non-volatile memory 906. Processor 903 may include multiple processors and/or core logics that constitute central processing units (CPUs) of the system and thus, control the overall operations of the system. According to certain embodiments, processor 903 accomplishes this by executing software stored in any of the memories 905-907, such as, for example, applications and operating systems, etc. Processor 903 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 903, which may be, for example, an Intel processor or a PowerPC processor, is coupled to cache memory 904 as shown in the example of FIG. 9. The bus 902 interconnects these various components together and also interconnects these components 903 and 905-907 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 9 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include an IEEE-1394 adapter, also known as FireWire adapter, for controlling FireWire devices. Other components may also be included.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing software as a service (SaaS), comprising:

creating, using a computer processor, a content marketplace comprising one or more catalogs having a plurality of standard content;

receiving a request for standard content from a client;

in response to receiving the request, searching the plurality of standard content in the content marketplace for standard content having characteristics requested by the client;

determining that the plurality of standard content in the content marketplace does not contain the characteristics requested by the client;

developing a specific content for the client having the characteristics requested by the client;

determining that the specific content developed for the client includes characteristics that are related to characteristics in specific content developed for other clients;

creating a standardized content from the specific content developed for the client and the specific content developed for the other clients; and publishing the standardized content to the content marketplace.

2. The method of claim 1, further comprising:

transmitting a message over the network to one or more subscribers that have subscribed to a content service of a category associated with the standardized content regarding availability of the standardized content; and providing options for the one or more subscribers to browse and/or download the standardized content.

3. The method of claim 1, further comprising in response to a selection of content by a subscriber, prompting the subscriber to renew a subscription for a category associated with the selected content if the subscription of the subscriber has expired.

4. The method of claim 1, further comprising in response to a selection of content by a non-subscriber, providing the non-subscriber an option to either purchase rights to use the selected content or subscribe to a service to provide the selected content.

5. The method of claim 1, further comprising categorizing the standardized content according to a factor selected from at least one of country, industry, language, content type, content provider, price as a filtering criteria, and a business adaptation catalog.

* * * * *